(12) United States Patent
Tang

(10) Patent No.: US 7,945,215 B2
(45) Date of Patent: May 17, 2011

(54) ADAPTIVE TRANSMISSION POWER CONTROL FOR COGNITIVE RADIO

(75) Inventor: Haiyun Tang, Saratoga, CA (US)

(73) Assignee: ADAPTRUM, Inc., Milpitas, CA (US)

( * ) Notice: Subject to any disclaimer, the term of this patent is extended or adjusted under 35 U.S.C. 154(b) by 495 days.

(21) Appl. No.: 12/034,647

(22) Filed: Feb. 20, 2008

(65) Prior Publication Data

US 2008/0207248 A1  Aug. 28, 2008

Related U.S. Application Data

(60) Provisional application No. 60/890,801, filed on Feb. 20, 2007.

(51) Int. Cl.
*H04B 1/00* (2006.01)
(52) U.S. Cl. .......................... 455/69; 455/501
(58) Field of Classification Search .............. 455/69, 455/522, 3.06, 501, 504, 506
See application file for complete search history.

(56) References Cited

U.S. PATENT DOCUMENTS

| | | | |
|---|---|---|---|
| 1,296,464 A | 3/1919 | Blumenberg, Jr. | |
| 5,457,813 A | 10/1995 | Poutanen | |
| 5,574,990 A | 11/1996 | Flanagan | |
| 6,252,912 B1 | 6/2001 | Salinger | |
| 6,266,517 B1 | 7/2001 | Fitzpatrick et al. | |
| 6,334,047 B1 | 12/2001 | Andersson et al. | |
| 6,512,917 B1 | 1/2003 | Hiramatsu | |
| 6,628,956 B2 | 9/2003 | Bark et al. | |
| 6,658,045 B1 | 12/2003 | Jin | |
| 6,701,134 B1 | 3/2004 | Epperson | |
| 6,771,957 B2 | 8/2004 | Chitrapu | |
| 2003/0007548 A1 | 1/2003 | Nagano | |
| 2004/0097189 A1* | 5/2004 | Bongfeldt et al. | 455/7 |
| 2006/0166692 A1* | 7/2006 | Waltho et al. | 455/522 |
| 2006/0209985 A1 | 9/2006 | Kang | |
| 2006/0256884 A1 | 11/2006 | Tomioka et al. | |

FOREIGN PATENT DOCUMENTS

| KR | 10-20020045866 | 6/2002 |
|---|---|---|
| KR | 10-2005-0116863 | 12/2002 |

OTHER PUBLICATIONS

Pawelczak, et al, Cognitive Radio Emergency Networks Requirements and Design, New Fontiers in Dynamic Spectrum Access Networks, Nov. 2005, pp. 601-606, Publisher: First IEEE International Symposium.

* cited by examiner

*Primary Examiner* — Tu X Nguyen
(74) *Attorney, Agent, or Firm* — West & Associates A PC; Stuart J. West; Theodore A. Marsh (57) ABSTRACT

Embodiments of cognitive radio technology can recover and utilize under-utilized portions of statically-allocated radio-frequency spectrum. A plurality of sensing methods can be employed. Transmission power control can be responsive to adjacent channel measurements. Digital pre-distortion techniques can enhance performance. Embodiments of a high DNR transceiver architecture can be employed.

6 Claims, 8 Drawing Sheets

ADAPTIVE TRANSMISSION POWER CONTROL FOR COGNITIVE RADIO

PRIORITY

This application is related to and claims priority under 35 U.S.C. 119(e) to U.S. Provisional Patent Application No. 60/890,801 filed on Feb. 20, 2007 entitled "SYSTEM AND METHOD FOR COGNITIVE RADIO" by Haiyun Tang the complete content of which is hereby incorporated by reference.

FEDERALLY SPONSORED RESEARCH

Background

1. Field of the Invention

The inventions herein described relate to systems and methods for cognitive radio.

2. Description of the Related Art

Spectrum Utilization Problems

A recent study by the FCC Spectrum Task Force [United States' Federal Communications Commission (FCC), "Report of the spectrum efficiency working group," November 2002, http://www.fcc.gov/sptf/files/IPWGFinalReport.pdf] found that while the available spectrum becomes increasingly scarce, the assigned spectrum is significantly underutilized. This imbalance between spectrum scarcity and spectrum underutilization is especially inappropriate in this Information Age, when a significant amount of spectrum is needed to provide ubiquitous wireless broadband connectivity, which is increasingly becoming an indispensable part of everyday life.

Static spectrum allocation over time can also result in spectrum fragmentation. With lack of an overall plan, spectrum allocations in the US and other countries over the past several decades can appear to be random. Despite some efforts to serve best interests at the time, this leads to significant spectrum fragmentation over time. The problem is exacerbated at a global level due to a lack of coordinated regional spectrum assignments. In order to operate under such spectrum conditions, a device can benefit from operational flexibility in frequency and/or band shape; such properties can help to maximally exploit local spectrum availability.

To address the above problems, an improved radio technology is needed that is capable of dynamically sensing and locating unused spectrum segments, and, communicating using these spectrum segments while essentially not causing harmful interference to designated users of the spectrum. Such a radio is generally referred to as a cognitive radio, although strictly speaking, it may perform only spectrum cognition functions and therefore can be a subtype of a broad-sense cognitive radio [J. M. III, "Cognitive radio for flexible mobile multimedia communications," *Mobile Networks and Applications*, vol. 6, September 2001.] that learns and reacts to its operating environment. Key aspects of a cognitive radio can include:

Sensing: a capability to identify used and/or unused segments of spectrum.

Flexibility: a capability to change operating frequency and/or band shape; this can be employed to fit into unused spectrum segments.

Non-interference: a capability to avoid causing harmful interference to designated users of the spectrum.

Such a cognitive radio technology can improve spectrum efficiency by dynamically exploiting underutilized spectrum, and, can operate at any geographic region without prior knowledge about local spectrum assignments. It has been an active research area recently.

FCC Spectrum Reform Initiatives

FCC has been at the forefront of promoting new spectrum sharing technologies. In April 2002, the FCC issued an amendment to Part 15 rules that allows ultra-wideband (UWB) underlay in the existing spectrum [FCC, "FCC first report and order: Revision of part 15 of the commission's rules regarding ultra-wideband transmission systems," ET Docket No. 98-153, April 2002]. In June 2002, the FCC established a Spectrum Policy Task Force (SPTF) whose study on the current spectrum usage concluded that "many portions of the radio spectrum are not in use for significant periods of time, and that spectrum use of these 'white spaces' (both temporal and geographic) can be increased significantly". SPTF recommended policy changes to facilitate "opportunistic or dynamic use of existing bands." In December 2003, FCC issued the notice of proposed rule making on "Facilitating Opportunities for Flexible, Efficient and Reliable Spectrum Use Employing Cognitive Radio Technologies" [FCC, "Facilitating opportunities for flexible, efficient, and reliable spectrum use employing cognitive radio technologies," ET Docket No. 03-108, December 2003] stating that "by initiating this proceeding, we recognize the importance of new cognitive radio technologies, which are likely to become more prevalent over the next few years and which hold tremendous promise in helping to facilitate more effective and efficient access to spectrum."

Figure 1:
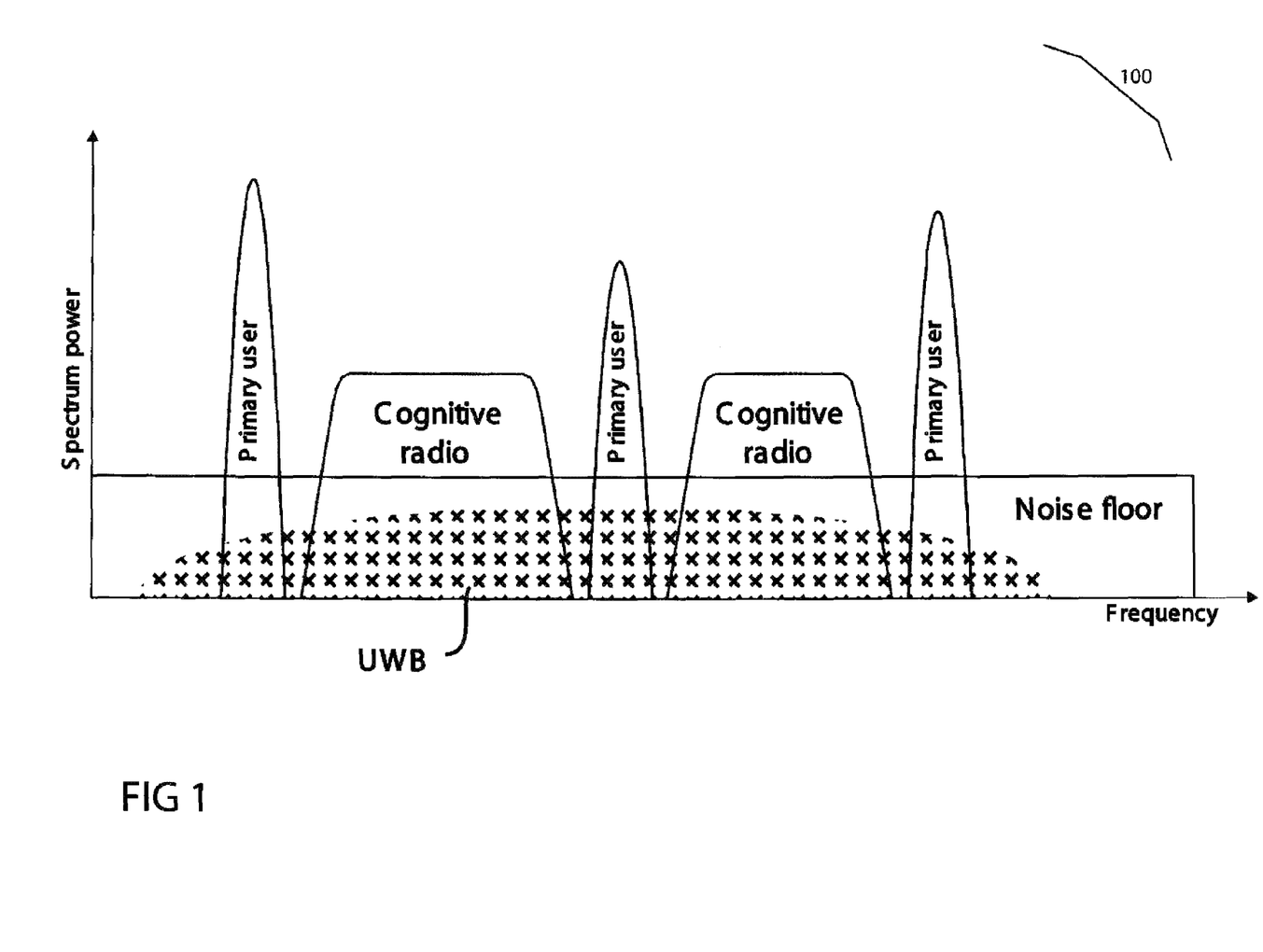

While both UWB and cognitive radio are considered as spectrum sharing technologies, their approaches to spectrum sharing are substantially different. UWB is an underlay (below noise floor) spectrum sharing technology, while cognitive radio is an overlay (above noise floor) and interlay (between primary user signals) spectrum sharing technology as shown in FIG. 1. Through sensing combined with operational flexibility, a cognitive radio can identify and make use of spectral "white spaces" between primary user signals. Because a cognitive user signal resides in such "white spaces", high signal transmission power can be permitted as long as signal power leakage into primary user bands does not embody harmful interference.

Broadcast TV Bands

Figure 2:
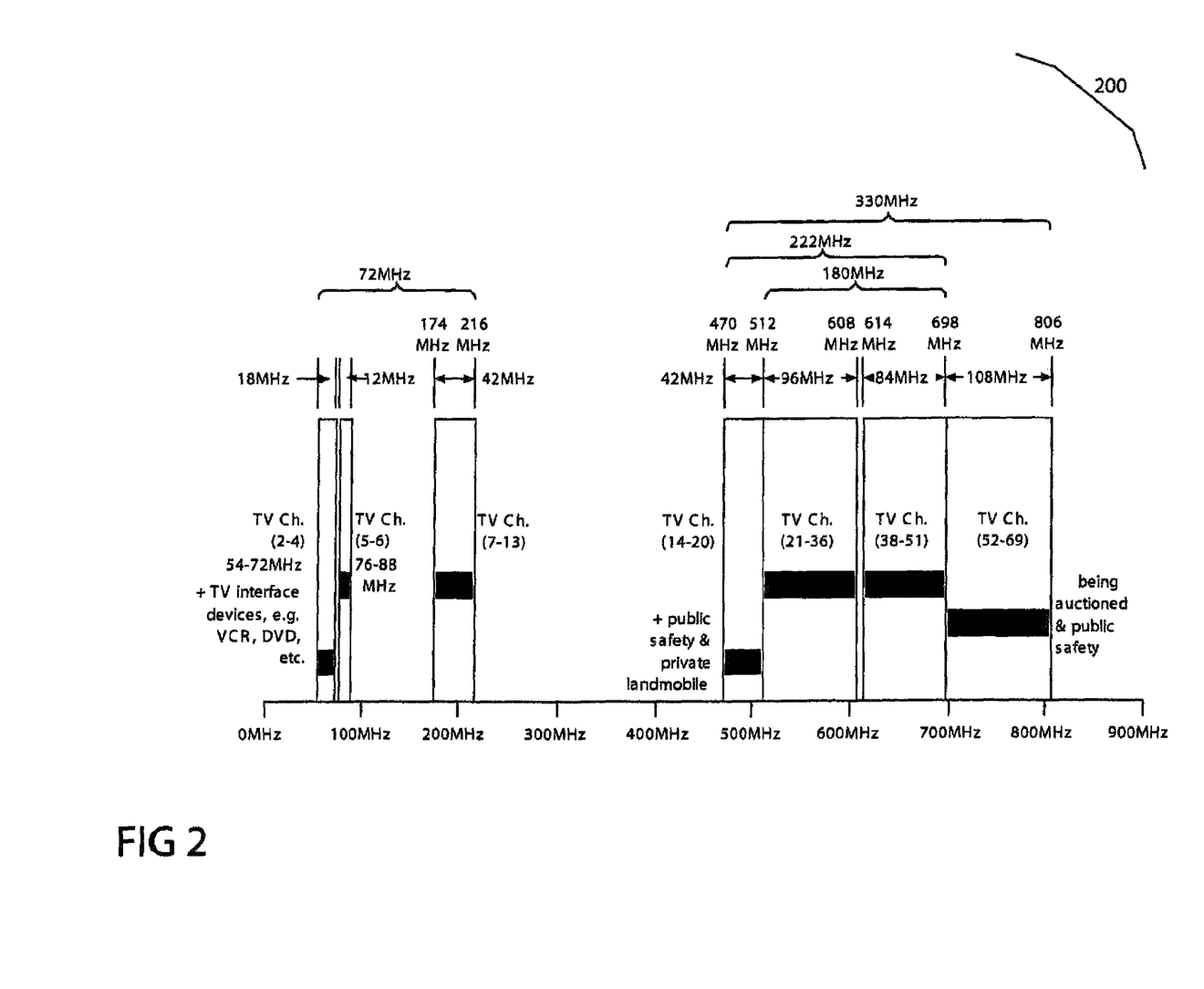

Exemplary broadcast TV bands are shown in Graph 200 of FIG. 2. Each TV channel is 6 MHz wide. Between 0 and 800 MHz, there are a total of 67 TV channels (Channels 2 to 69 excluding Channel 37 which is reserved for radio astronomy). The NPRM [FCC, May 2004, op. cit.] excludes certain channels for unlicensed use: Channels 2-4, which are used by TV peripheral devices, and Channels 52-69, which are considered for future auction. Among the channels remaining, Channels 5-6, 7-13, 21-36, and 38-51 are available for unlicensed use in all areas. Unlicensed use in Channels 14-20 is allowed only in areas where they are not used by public safety agencies [FCC, May 2004, op. cit.].

It can be appreciated that Channels 52-69 are currently used by TV broadcasters and it is not clear if/when they will be vacated. There is significant interference in the lower channels 5-6 and 7-13. Based on these considerations, the spectrum segment 470-806 MHz covering TV channels 14-69 can be of particular interest.

Spectrum Opportunity in the TV Bands

Figure 3:
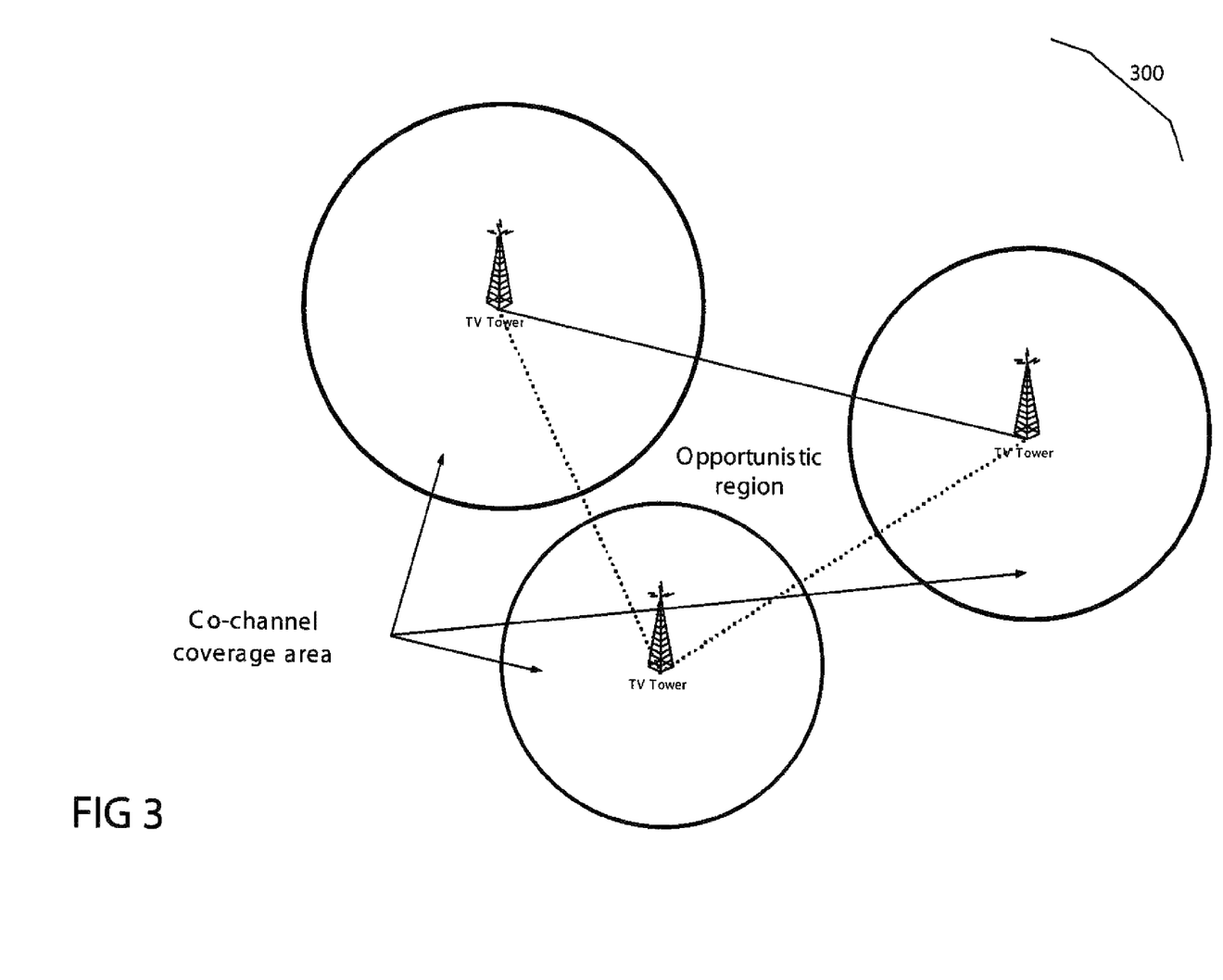

Spectrum opportunity can be a direct result of incumbent system inefficiency. In TV bands, a signal from a TV tower can cover an area with a radius of tens of kilometers. TV receivers can be sensitive to interference such that TV cell planning may be very conservative to ensure there is essentially no co-channel interference. This can leave a substantial amount of "white spaces" between co-channel TV cells as illustrated in the Map 300 of FIG. 3. Those "white spaces" can constitute an opportunistic region for cognitive users on a particular TV channel. Each TV channel may have a differently shaped opportunistic region. The total spectrum opportunity at any location can comprise the total number of opportunistic regions covering the location. A measurement in one locality shows an average spectrum opportunity in TV channels 14-69 of about 28 channels; that can be expressed as an equivalent bandwidth of approximately 170 MHz.

BRIEF DESCRIPTION OF THE DRAWINGS

FIG. 1 graph of spectrum sharing technologies: UWB and cognitive radio
FIG. 2 graph of exemplary television channel bands
FIG. 3 map of television co-channel coverage areas and opportunistic region
FIG. 4 diagram of a cognitive radio system
FIG. 5 graph of a DTV transmission mask
FIG. 6 graph of simulated non-linearities
FIG. 7 diagram of an adjacent channel interference situation
FIG. 8 diagram of an adjacent channel measurement based adaptive transmission power control system

DETAILED DESCRIPTION

Figure 4:
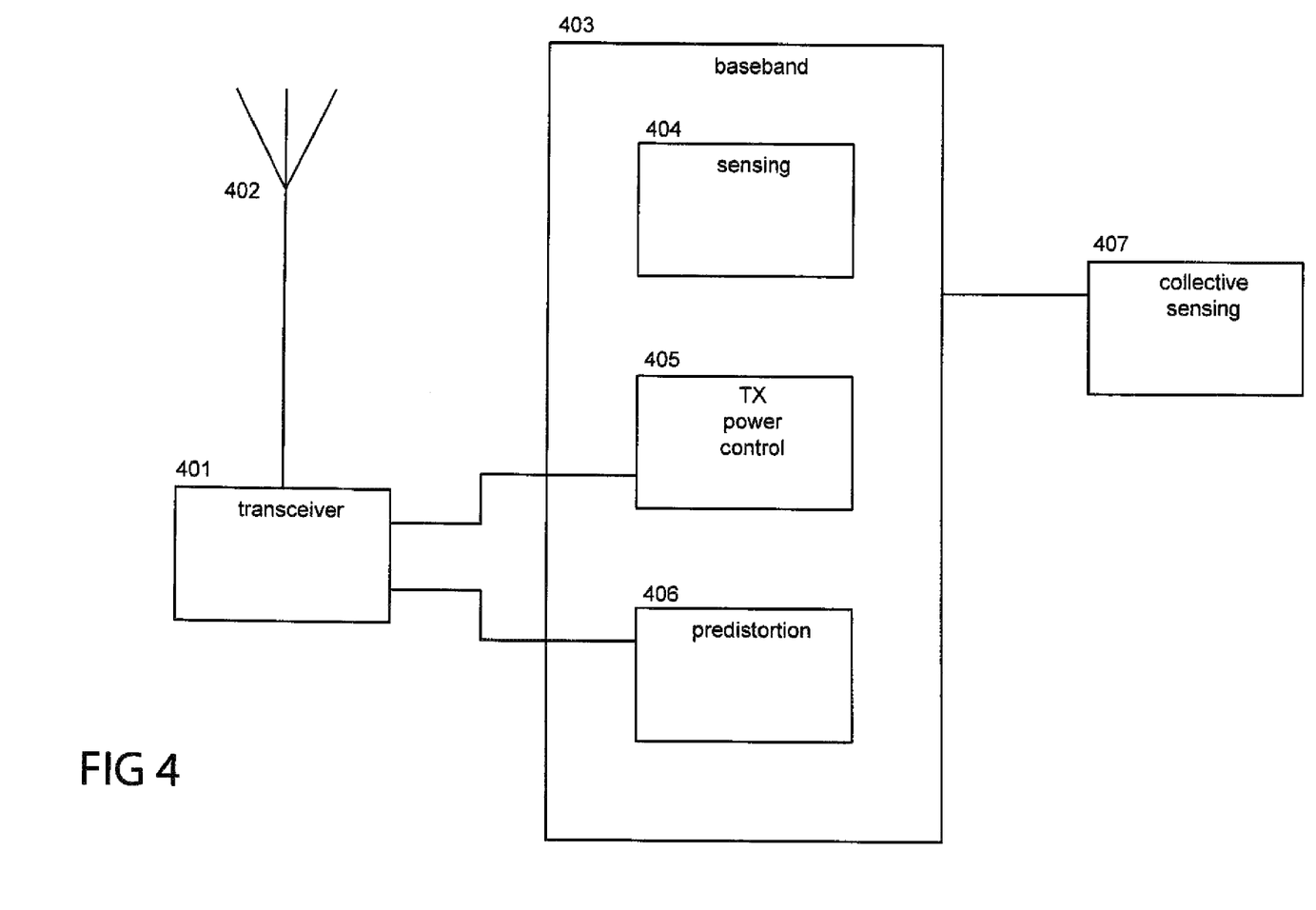

FIG. 4 depicts an embodiment of a cognitive radio system in block diagram. A transceiver 401 can be coupled with and/or in communication with one or more antennae 402. Baseband signal processing can be provided by elements of a baseband processor 403. Elements of a baseband processor 403 can comprise a sensing processor 404, a transmit power control element 405, and a pre-distortion element 406. In some embodiments a pre-distortion element 406 can be coupled with and/or in communication with a transceiver 401. In some embodiments a transmit power control element can be coupled with and/or in communication with a transceiver 401. In some embodiments a collective sensing element 407 can be coupled with and/or in communication with a baseband processor 403 and/or elements comprising a baseband processor.

In some embodiments transceiver 401 can comprise transceiver and/or transmitter and/or receiver mechanisms disclosed herein. In some embodiments sensing element 404 can comprise one or more sensing mechanisms as described herein. By way of example and not limitation these sensing mechanisms can include energy sensing, NTSC signal sensing, and/or ATSC signal sensing. In some embodiments a collective sensing element 407 can provide collective sensing mechanisms as described herein.

In some embodiments transmit power control 405 can support adaptive transmit power control mechanisms described herein. In some embodiments pre-distortion element 406 can provide digital pre-distortion mechanisms as described herein.

In some embodiments baseband processor 403 can support additional processing mechanisms as described herein. By way of example and not limitation these mechanisms can include filtering and/or reconstruction.

Adaptive Transmission Power Control:

In some embodiments, a cognitive user device (cognitive user) can transmit on a channel after determining that channel to be vacant through sensing. The TV-band NPRM [FCC, May 2004, op. cit.] allows a maximum transmission power of 30 dBm (1 W). However, because of transmitter windowing and nonlinearity, a portion of cognitive user transmission power can leak into the adjacent channels and can create adjacent channel interference. Adjacent channel interference can be maintained below a specified level in order to guarantee performance in adjacent channels. Maximum transmission power from a cognitive user can be limited by such an adjacent channel interference requirement. Adaptive transmission power control can be performed by a cognitive user in order to optimize and/or maximize transmission potential for a specified channel while causing essentially no harm to operational use of adjacent channels.

Figure 5:
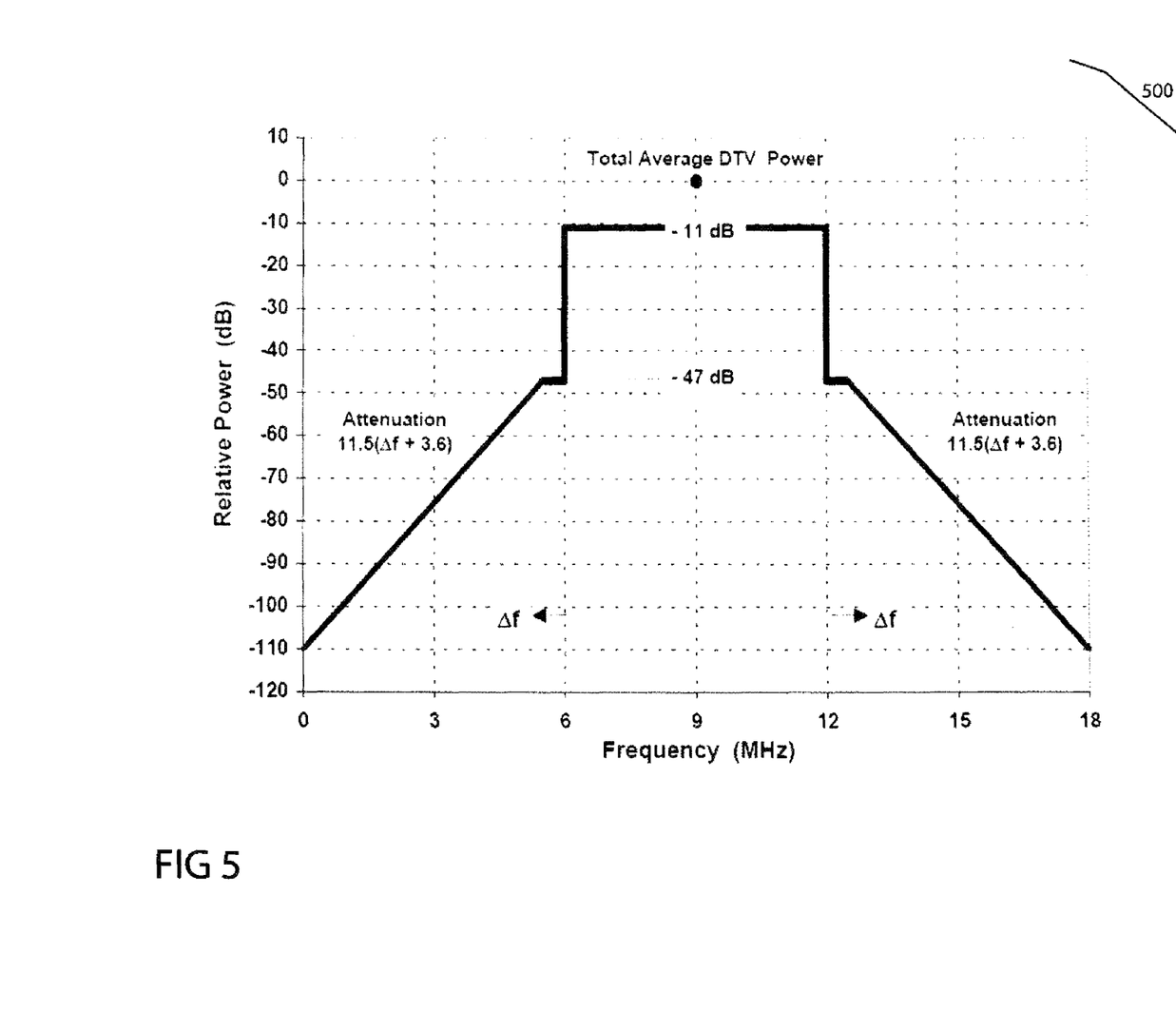

Adjacent Channel Interference Requirement:

The FCC may adopt the DTV transmit mask as shown in the graph 500 of FIG. 5 for a TV-band cognitive radio. This can define exemplary constraints for a cognitive radio transmitter, notably regarding interference with adjacent channels.

Figure 6:
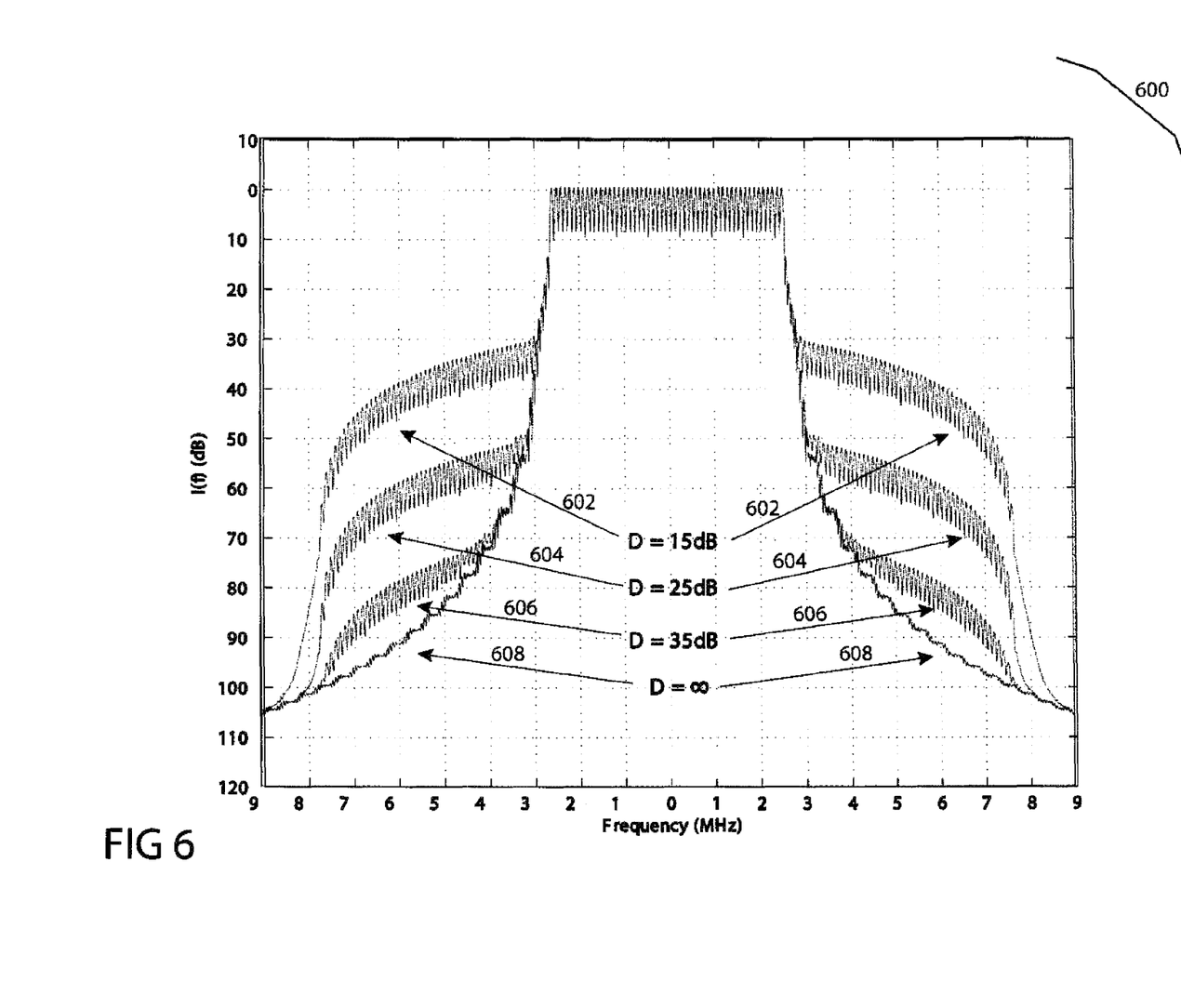

Graph 600 of FIG. 6 illustrates simulations of signal power spectra for embodiments of a transmitter with specified non-linearities. These spectra illustrate exemplary leakage behavior in some transmitter embodiments.

Figure 7:
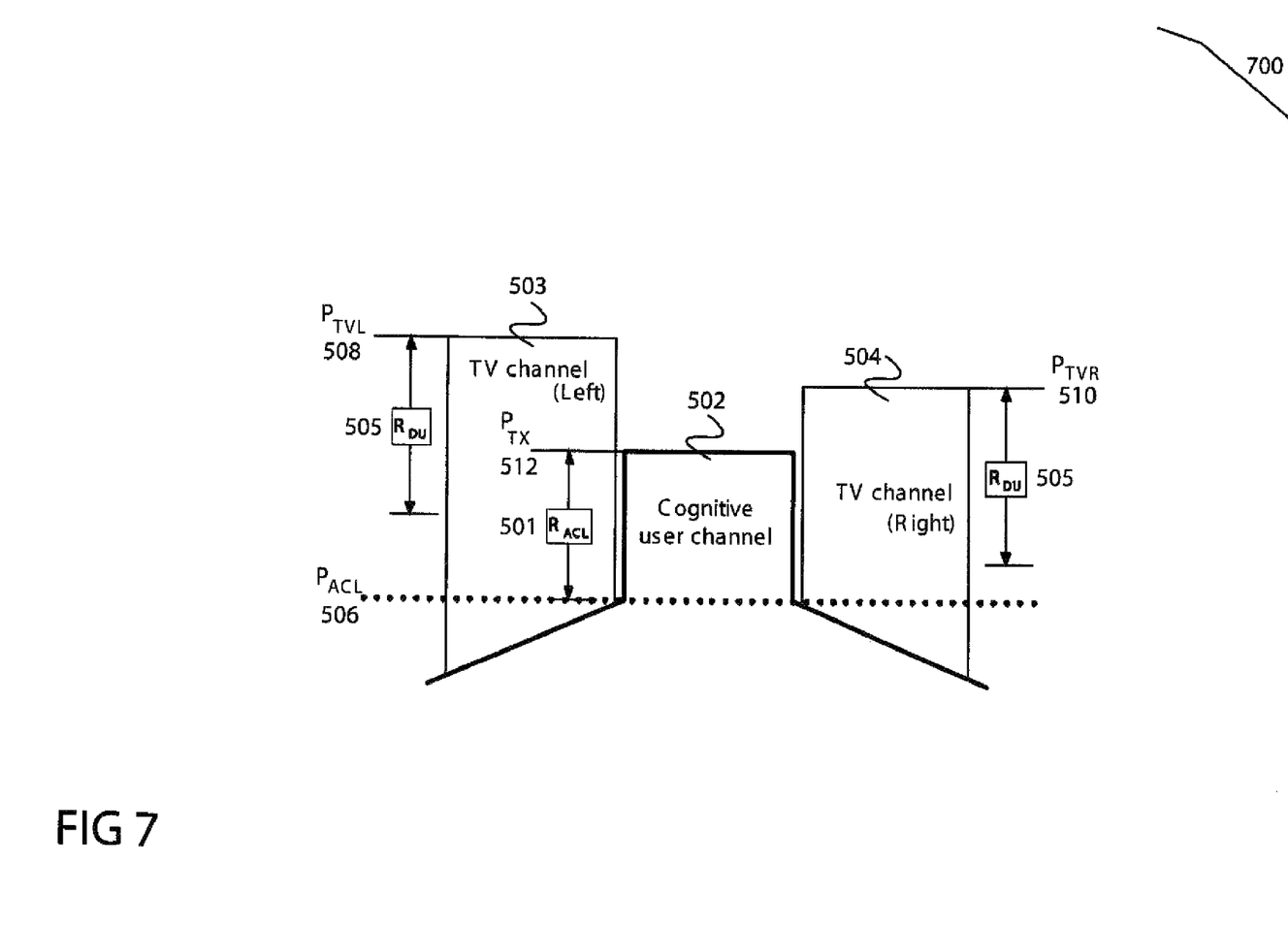

Given a specified inband signal transmission power $P_{TX}$, an amount of adjacent channel leakage (ACL) can be expressed in decibel (dB) units as:

$$P_{ACL} = P_{TX} - R_{ACL} \quad (1)$$

where $R_{ACL}$ 701 is a ratio between inband signal power and out-of-band leakage power due to a combined effect of windowing and nonlinearity, as discussed herein with regards to non-linearity analysis and simulation. In practice, leakage can typically be dominated by transmitter nonlinearity as shown in FIG. 6 such that (in dB units):

$$R_{ACL} = 2D \quad (2)$$

where D is the IP3 (third-order intercept point) clearance of Equation (19) discussed herein. In some embodiments, a digital pre-distortion technique can further reduce the above leakage. In some embodiments a digital predistortion technique can further reduce the above leakage by approximately 20 dB.

The graph 700 of FIG. 7 illustrates an adjacent channel interference situation wherein a signal transmission on a cognitive user channel 702 can cause interference to one or more adjacent TV channels 703 704. A maximum tolerable interference on a TV channel can be specified by a desired-to-undesired ratio (DU ratio), $R_{DU}$ 705. In some embodiments, $R_{DU}$ 705 can have a typical value of approximately 30 dB. A maximum allowable interference power $P_{ACL}$ 706 at any TV receiver can be expressed as a received TV signal power $P_{TV}$ minus a DU ratio in dB units, i.e.

$$P_{ACL} = P_{TV} - R_{DU} \quad (3)$$

In order to set an interference-free condition that can be guaranteed on both adjacent TV channels, $$P_{TV} = \min\{P_{TVL}, P_{TVR}\} \quad (4)$$

where $P_{TVL}$ 708 and $P_{TVR}$ 710 are received signal powers on left and right adjacent TV channels, respectively.

Combining equations (1) and (3), a cognitive user transmission power requirement $P_{TX}$ 712 can be obtained (in dB):

$$P_{TX} = P_{TV} - R_{DU} + R_{ACL} \quad (5)$$

Equation (5) expresses a cognitive user transmission power requirement for a TV receiver disposed at essentially the same location as a cognitive transmitter. However, in some embodiments, each cognitive transmitter can have a specified clearance region within which interference can be ignored. In the TV-band NPRM [FCC, May 2004. op. cit.], a radius of such a clearance region is specified as 10 meters. A worst-case interference can occur at an edge of a clearance region. Signal power loss $K(r_0)$ from a transmitter to an edge of the clearance region can be derived from the Friis free-space equation [T. S. Rappaport, op. cit.]. Thus a cognitive user transmission power requirement $P(r_0)$ can be expressed:

$$P(r_0)=P_{TV}-R_{DU}+R_{ACL} \Rightarrow P_{TX}=P_{TV}-R_{DU}+R_{ACL}+K(r_0) \quad (6)$$

In an exemplary embodiment, $P_{TV}=-60$ dBm, $R_{DU}=30$ dB, $R_{ACL}=60$ dB, and $K(r_0)=48$ dB, so a maximum allowed cognitive user transmission power can be:

$$P_{TX}=-60-30+60+48=18 \text{ dBm} \quad (7)$$

or approximately 60 mW.

Reducing adjacent channel leakage ratio—through windowing and/or digital pre-distortion techniques—can be key to increasing cognitive user transmission power allowed. A 10 dB reduction in $R_{ACL}$ can result in a tenfold increase in allowed transmission power.

Adaptive Transmission Power Control:

Cognitive user transmission power for a specified channel can be maximized while causing less than a harmful level of interference in adjacent channels; cognitive user transmission power can be responsive to received signal powers on adjacent TV channels in accord with Equations (4) and (6).

In some embodiments that employ collective sensing techniques, each cognitive user can periodically broadcast its sensing results in a specified manner; such results can comprise per channel SNR estimates. By collecting sensing results, in some embodiments a cognitive user can obtain a consensus estimate of signal power on one or more specified channels. Estimated signal powers on adjacent channels can then be used to derive a suitable transmission power using Equations (4) and (6). It can be appreciated that if one of the adjacent channels is deemed vacant, that vacant channel can be advantageously removed from consideration in equation (4). An adjacent channel leakage ratio $R_{ACL}$ in equation (6) can be obtained based on pre-tabulated transmitter nonlinearity characteristics and/or through active monitoring of a transmitted signal in an embodiment employing a digital predistortion technique.

Figure 8:
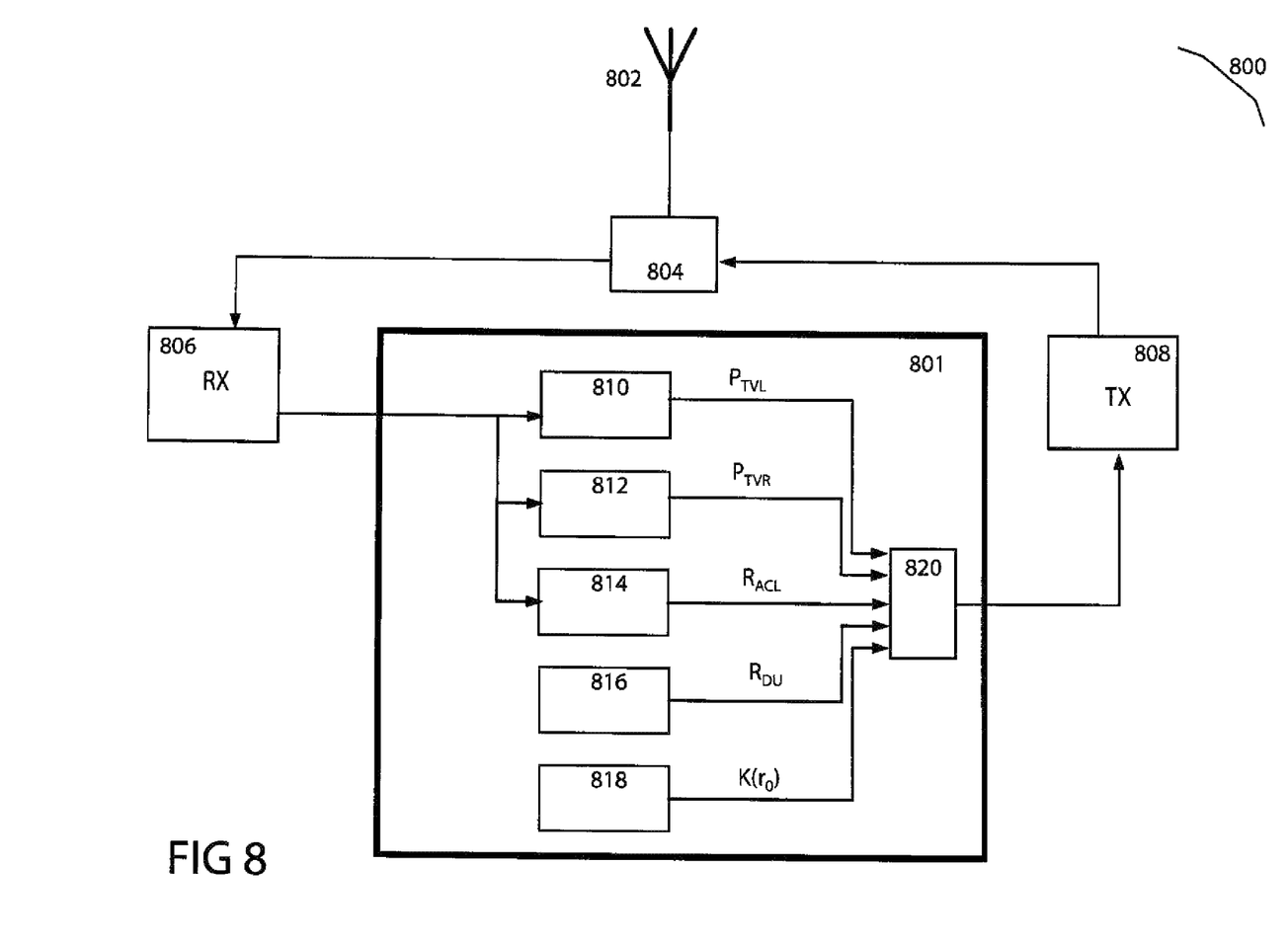

Diagram 800 of FIG. 8 depicts a system embodiment of adjacent channel measurement based adaptive transmission power control. A cognitive radio receiver RX 806 can receive a broadcast signal from antenna 802 via coupler 804. The receiver RX 806 can provide processing to a received signal (e.g., a broadcast signal) so as to provide specified bands and/or channels to a power measurement and control unit PMC 801. PMC 801 can comprise power measurement elements 810 812 814 corresponding respectively to adjacent left channel signal power $P_{TVL}$, adjacent right channel signal power $P_{TVR}$, and adjacent channel leakage ratio $R_{ACL}$. Each of the elements 810 812 814 can operate on a signal received from RX 806 to provide a corresponding power measurement; $P_{TVL}$, $P_{TVR}$, and $R_{ACL}$ respectively. PMC 801 can further comprise elements that provide specified parameters: desired-to-undesired ratio $R_{DU}$ and clearance region attenuation $K(r_0)$. A control element 820 can receive parameters $P_{TVL}$, $P_{TVR}$, $R_{ACL}$, $R_{DU}$, and $K(r_0)$ from respectively corresponding elements 810 812 814 816 818 and responsively provide a control signal to cognitive radio transmitter TX 808.

Control element 820 can process parameters $P_{TVL}$, $P_{TVR}$, $R_{ACL}$, $R_{DU}$, and $K(r_0)$ according to Equation (6) and provide a control signal to TX 808 that specifies a power transmission level $P_{TX}$ as specified by Equation (6), given the values of the parameters supplied by elements 810 812 814 816 818. Cognitive transmitter TX 808 can be adapted to provide transmission power $P_{TX}$ for a channel at a level specified by a control signal received from control element 820. It can be appreciated that control element 820 can also provide evaluation of Equation (4), so as to provide a $P_{TV}$ term to Equation (6) from the contributing parameters $P_{TVL}$ and $P_{TVR}$. Thus, TX 808 can provide cognitive radio transmission of a channel through antenna 802 via coupler 804 at an advantageous power level $P_{TX}$ specified by control element 820 and corresponding to Equation (6). It can be appreciated that in some embodiments this system comprises an adaptive system; a provided power transmission level $P_{TX}$ can change, that is, adapt, over time and in response to variations of specified and/or measured parameters.

Transmitter Nonlinearity Analysis and Simulation:

Transmitter nonlinearity can be a cause of adjacent channel leakage. A transmitter nonlinearity can be modeled as:

$$y(t) \approx \alpha_0 + \alpha_1 x(t) + \alpha_2 x^2(t) + \alpha_3 x^3(t) + \quad (8)$$

For a passband signal with appropriate filtering, a nonlinearity model can be approximated as:

$$y(t) \approx \alpha_1 x(t) + \alpha_3 x^3(t) \quad (9)$$

and an equivalent baseband representation of a signal that has experienced such nonlinearity can be expressed as $$y(t) = \alpha_1 s(t) + \frac{3\alpha_3}{4}|s(t)|^2 s(t) \quad (10)$$

Let $$y_1(t) = s(t) \quad (11)$$

$$y_3(t) = |s(t)|^2 s(t) \quad (12)$$

Using a baseband signal expression for s(t), it follows that:

$$Y_1(f) = \int_{-\infty}^{\infty} y_1(t)e^{-j2\pi ft} dt \quad (13)$$
$$= \sum_{k \in \Omega} X(k) \int_{-\infty}^{\infty} h(t)e^{j2\pi\frac{k}{T}t}e^{-j2\pi ft} dt$$
$$= \sum_{k \in \Omega} X(k)H\left(f - \frac{k}{T}\right)$$

and $$Y_3(f) = \int_{-\infty}^{\infty} y_3(t)e^{-j2\pi ft} dt \quad (14)$$
$$= \int_{-\infty}^{\infty} s(t)s(t)s^*(t)e^{-j2\pi ft} dt$$
$$= \sum_{k,l,m \in \Omega} X(k)X(l)X^*(m) \int_{-\infty}^{\infty} g(t)e^{j2\pi\frac{k+l-m}{T}t}e^{-j2\pi ft} dt$$
$$= \sum_{k,l,m \in \Omega} X(k)X(l)X^*(m)G\left(f - \frac{k+l-m}{T}\right)$$

where in the second equality $$g(t)=h^3(t) \quad (15)$$

whose Fourier transform can be expressed as $$G(f)=H(f) \otimes H(f) \otimes H(f) \quad (16)$$

Note that the window h(t) is a real function.

A signal spectrum can be expressed $$Y(f) = \alpha_1 Y_1(f) + \frac{3\alpha_3}{4} Y_3(f) \quad (17)$$

$$= \alpha_1 \sum_{k \in \Omega} X(k) H\left(f - \frac{k}{T}\right) + \frac{3\alpha_3}{4} \sum_{k,l,m \in \Omega} X(k) X(l) X^*(m)$$

$$G\left(f - \frac{k+l-m}{T}\right)$$

and the power spectrum can be expressed $$I(f) = E[|Y(f)|^2] \quad (18)$$

$$= E\left[\left\{\alpha_1 Y_1(f) + \frac{3\alpha_3}{4} Y_3(f)\right\}\left\{\alpha_1 Y_1^*(f) + \frac{3\alpha_3}{4} Y_3^*(f)\right\}\right]$$

$$= \alpha_1^2 E[|Y_1(f)|^2] + 2\alpha_1 \frac{3\alpha_3}{4} Re\{E[Y_3(f) Y_1^*(f)]\} + \left(\frac{3\alpha_3}{4}\right)^2$$

$$E[|Y_3(f)|^2]$$

A relationship between device nonlinearity coefficients $\alpha_1$ and $\alpha_3$ can be expressed in terms of a two-tone IP3. Specifically, input power to the two-tone test can be $P_{In}$ at a distance D (in dB units) from an IP3 point $P_{IP3}$, i.e.

$$P_{IP3} = D\alpha_1^2 P_{In} \quad (19)$$

it follows that $$\frac{3\alpha_3}{4} = -\frac{\alpha_1^3}{P_{IP3}} = -\frac{\alpha_1}{DP_{In}} \quad (20)$$

where compressive third-order nonlinearity can be assumed with $\alpha_3 < 0$. A multi-carrier (such as OFDM) signal of substantially the same input power can be applied to a nonlinear device; the output power spectrum can be expressed $$I(f) = \quad (21)$$

$$\alpha_1^2 E[|Y_1(f)|^2] - 2\alpha_1^2 \frac{1}{DP_{In}} Re\{E[Y_3(f) Y_1^*(f)]\} + \alpha_1^2 \frac{1}{D^2 P_{In}^2} E[|Y_3(f)|^2]$$

where the input power of the multi-carrier signal can be expressed $$P_{In} = E\left[\frac{1}{T_W} \int_{-\infty}^{\infty} |y_1(t)|^2 dt\right] \quad (22)$$

$$= E\left[\frac{1}{T_W} \int_{-\infty}^{\infty} |Y_1(f)|^2 df\right]$$

$$= \frac{1}{T_W} \int_{-\infty}^{\infty} E[|Y_1(f)|^2] df$$

The graph 600 of FIG. 6 shows simulated multi-carrier signal power spectrums at different IP3s (or different Ds). Nonlinearity can cause spectrum "shoulders" in adjacent bands. A difference (in decibel units, (dB)) between inband signal power and the shoulder can be roughly 2D, or the system dynamic range $P_{DR}$.

The graph 600 illustrates simulated signal power spectra under varying device nonlinearities in a multi-carrier system with subcarrier spacing 100 kHz, β=0.16, number of guard band subcarriers 8 (and number of valid data subcarriers 52). Individual curves 602 604 606 608 are shown for IP3-related distance D values of (respectively) 15 dB, 25 dB, 35 dB, and ∞.

In some embodiments with a fixed output power, a higher device IP3 can be required in order to reduce adjacent channel leakage. In some embodiments, an IP3 requirement can be reduced by applying a digital predistortion technique and/or process.

In the foregoing specification, the embodiments have been described with reference to specific elements thereof. It will, however, be evident that various modifications and changes may be made thereto without departing from the broader spirit and scope of the embodiments. For example, the reader is to understand that the specific ordering and combination of process actions shown in the process flow diagrams described herein is merely illustrative, and that using different or additional process actions, or a different combination or ordering of process actions can be used to enact the embodiments. For example, specific reference to NTSC and/or ATSC and/or DTV embodiments are provided by way of non-limiting examples. Systems and methods herein described can be applicable to any other known and/or convenient channel-based communication embodiments; these can comprise single and/or multiple carriers per channel. The specification and drawings are, accordingly, to be regarded in an illustrative rather than restrictive sense.

What is claimed is:

1. A cognitive radio system comprising:
a cognitive radio receiver adapted to
receive a broadcast signal, and,
provide a first specified channel and a plurality of adjacent channels, responsive to the broadcast signal,
wherein the plurality of adjacent channels comprises a first adjacent channel and a second adjacent channel;
a power measurement and control unit adapted to
receive the first specified channel and the plurality of adjacent channels,
determine a first parameter,
determine a second parameter,
determine a third parameter,
wherein the first parameter corresponds to a first adjacent channel received signal power,
wherein the second parameter corresponds to a second adjacent channel received signal power,
wherein the third parameter corresponds to an adjacent channel leakage ratio; and,
a control element adapted to
receive the first parameter, the second parameter, the third parameter, a fourth parameter, and a fifth parameter,
determine a value corresponding to a maximum allowed cognitive user transmission power level for the first specified channel, responsive to the received parameters, and,
provide a control signal corresponding to the first specified channel,
wherein the control signal specifies the value,
wherein the fourth parameter corresponds to a specified signal power loss, and,
wherein the fifth parameter corresponds to a specified desired-to-undesired ratio; and,
a cognitive radio transmitter adapted to
receive the control signal, and,
provide transmission power for the first specified channel at a transmission power level responsive to the value.

2. The system of claim 1 wherein:
the value is at least partially determined by a combination of:
the lesser of the first parameter and the second parameter,
the third parameter,
the fourth parameter, and,
the fifth parameter.

3. The system of claim 1 wherein:
one or more of the first, second, and third parameters are at least partially determined by a collective sensing technique.

4. A method of adaptive transmission power control for cognitive radio comprising the steps of:
receiving a broadcast signal;
providing a first specified channel and a plurality of adjacent channels, responsive to the broadcast signal;
receiving the first specified channel and the plurality of adjacent channels;
determining a first parameter;
determining a second parameter;
determining a third parameter;
receiving the first parameter, the second parameter, the third parameter, a fourth parameter, and a fifth parameter;
determining a value corresponding to a maximum allowed cognitive user transmission power level for the first specified channel, responsive to the received parameters;
providing a control signal corresponding to the first specified channel;
providing a cognitive radio transmitter;
receiving the control signal; and,
providing transmission power for the first specified channel at a transmission power level responsive to the value;
wherein the control signal specifies the value;
wherein the plurality of adjacent channels comprises a first adjacent channel and a second adjacent channel;
wherein the first parameter corresponds to a first adjacent channel received signal power;
wherein the second parameter corresponds to a second adjacent channel received signal power;
wherein the third parameter corresponds to an adjacent channel leakage ratio;
wherein the fourth parameter corresponds to a specified signal power loss; and,
wherein the fifth parameter corresponds to a specified desired-to-undesired ratio.

5. The method of claim 4 further comprising the step of:
at least partially determining the value by a combination of:
the lesser of the first parameter and the second parameter,
the third parameter,
the fourth parameter, and,
the fifth parameter.

6. The method of claim 4 further comprising the step of:
at least partially determining one or more of the first, second, and third parameters by a collective sensing technique.

* * * * *

UNITED STATES PATENT AND TRADEMARK OFFICE
CERTIFICATE OF CORRECTION

| | |
|---|---|
| PATENT NO. | : 7,945,215 B2 |
| APPLICATION NO. | : 12/034647 |
| DATED | : May 17, 2011 |
| INVENTOR(S) | : Haiyun Tang |

Page 1 of 1

It is certified that error appears in the above-identified patent and that said Letters Patent is hereby corrected as shown below:

Col. 1 lines 14-20
Immediately following the PRIORITY section ending with the words
"...by Haiyun Tang the complete content of which is hereby incorporated by reference.", and,
immediately preceding the BACKGROUND section,
currently reads:
    "FEDERALLY SPONSORED RESEARCH"
but should appear as follows:

STATEMENT REGARDING FEDERALLY SPONSORED RESEARCH AND
    DEVELOPMENT
This invention was made with Government support under contract FA8750-05-C-0067 awarded by the
Air Force. The Government has certain rights in the invention.

Signed and Sealed this
Twenty-second Day of May, 2012

David J. Kappos
*Director of the United States Patent and Trademark Office*